United States Patent
Fujikata

(10) Patent No.: US 11,009,726 B2
(45) Date of Patent: May 18, 2021

(54) ELECTROAB SORPTION OPTICAL MODULATOR

(71) Applicants: NEC CORPORATION, Tokyo (JP); PHOTONICS ELECTRONICS TECHNOLOGY RESEARCH ASSOCIATION, Tokyo (JP)

(72) Inventor: Junichi Fujikata, Tokyo (JP)

(73) Assignees: NEC CORPORATION, Tokyo (JP); PHOTONICS ELECTRONICS TECHNOLOGY RESEARCH ASSOCIATE, Tokyo (JP)

( * ) Notice: Subject to any disclaimer, the term of this patent is extended or adjusted under 35 U.S.C. 154(b) by 0 days.

(21) Appl. No.: 16/354,886

(22) Filed: Mar. 15, 2019

(65) Prior Publication Data

US 2019/0285916 A1     Sep. 19, 2019

(30) Foreign Application Priority Data

Mar. 16, 2018   (JP) ............................ JP2018-049913

(51) Int. Cl.
*G02F 1/025* (2006.01)
*G02F 1/015* (2006.01)
*G02B 6/12* (2006.01)

(52) U.S. Cl.
CPC .... *G02F 1/025* (2013.01); *G02B 2006/12142* (2013.01); *G02F 1/0157* (2021.01);
(Continued)

(58) Field of Classification Search
CPC ...... G02F 1/015; G02F 1/025; G02F 1/01708; G02F 2001/0151–0158
(Continued)

(56) References Cited

U.S. PATENT DOCUMENTS

| 5,738,732 A * | 4/1998 | Nakamura ............... H01L 31/06 136/254 |
| 7,010,179 B2 * | 3/2006 | Hatta ..................... G02F 1/0121 359/245 |

(Continued)

FOREIGN PATENT DOCUMENTS

| JP | 2006-515082 A | 5/2006 |
| JP | 2012-013935 A | 1/2012 |

(Continued)

OTHER PUBLICATIONS

"50Gb/s C-band GeSi Waveguide Electro-Absorption Modulator" by Srinivasan et al, Optical Fiber Conference, paper Tu3D.7, Mar. 2016.*

(Continued)

*Primary Examiner* — Robert Tavlylaev
(74) *Attorney, Agent, or Firm* — Sughrue Mion, PLLC

(57) ABSTRACT

An electro-absorption optical modulator capable of realizing optical coupling with a Si waveguide with high efficiency, improving modulation efficiency, reducing light absorption by an electrode layer and achieving low optical loss includes a substrate; a first silicon layer doped to exhibit a first type of conductivity and a second silicon layer doped to exhibit a second type of conductivity that are disposed parallel to the substrate; and a $Ge_{1-x}Si_x$ ($0<x<1$)/Si stack in which a $Ge_{1-x}Si_x$ layer and a Si layer are stacked on the first and second silicon layers in this order.

14 Claims, 9 Drawing Sheets

(52) U.S. Cl.
CPC .... *G02F 2201/063* (2013.01); *G02F 2202/10* (2013.01); *G02F 2202/105* (2013.01)

(58) Field of Classification Search
USPC ........................................................ 385/1–3
See application file for complete search history.

(56) References Cited

U.S. PATENT DOCUMENTS

| | | | | |
|---|---|---|---|---|
| 10,146,070 | B2* | 12/2018 | Fujikata | .................. G02F 1/225 |
| 2002/0038900 | A1* | 4/2002 | Yamauchi | .......... G02B 6/12004 |
| | | | | 257/432 |
| 2007/0222034 | A1* | 9/2007 | Park | .................. H01L 21/02532 |
| | | | | 257/616 |
| 2015/0093115 | A1* | 4/2015 | Uchiyama | ............... H04J 14/02 |
| | | | | 398/82 |
| 2018/0373067 | A1* | 12/2018 | Fujikata | .................. G02F 1/025 |

FOREIGN PATENT DOCUMENTS

| | | |
|---|---|---|
| JP | 2013-109170 A | 6/2013 |
| WO | 2016/125772 A1 | 8/2016 |

OTHER PUBLICATIONS

William M. J. Green et al., "Ultra-compact, low RF power, 10Gb/s silicon Mach-Zehnder modulator", Optics Express, Dec. 10, 2007, pp. 17106-171113, vol. 15, No. 25.

Dazeng Feng et al., "High-Speed GeSi Electroabsorption Modulator on the SOI Waveguide Platform", IEEE Journal of Selected Topics in Quantum Electronics, Nov. 2013, vol. 19, No. 6, 3401710, 10 pages.

* cited by examiner

ELECTROABSORPTION OPTICAL MODULATOR

INCORPORATION BY REFERENCE

This application is based upon and claims the benefit of priority from Japanese patent application No.2018-049913, filed on Mar. 16, 2018, the disclosure of which is incorporated herein in its entirety by reference.

TECHNICAL FIELD

The present invention relates to an electro-absorption optical modulator according to an electro-optic effect for high speed conversion of high speed electrical signals into optical signals that is required in the information processing and telecommunications fields.

BACKGROUND ART

Silicon-based optical communication devices functioning at 1310 and 1550 nm fiber-optic communication wavelengths for a variety of systems such as for fiber-to-the-home and local area networks (LANs) are highly promising technologies which enable integration of optical functioning elements and electronic circuits together on a silicon platform by means of CMOS technologies.

In recent years, silicon-based passive optical devices such as waveguides, couplers and wavelength filters have been studied very extensively. Important technologies for manipulating optical signals for such communication systems include silicon-based active devices such as electro-optic modulators and optical switches, which also have been attracting much attention. However, optical switches and optical modulators that use a thermo-optic effect of silicon to change the refractive index operate at low speed, and accordingly their use is limited to cases of device speeds corresponding to modulation frequencies not higher than 1 Mb/second. Accordingly, in order to realize a high modulation frequency demanded in a larger number of optical communication systems, electro-optic modulators using an electro-optic effect are required.

Most of the electro-optic modulators proposed to date are devices which use a carrier plasma effect to change the free carrier density in a silicon layer and thereby change the real and imaginary parts of the refractive index, thus changing the phase and intensity of light. Such wide use of the above-mentioned carrier plasma effect is because of the fact that pure silicon does not exhibit a linear electro-optic effect (the Pockels effect) and that a change in its refractive index due to the Franz-Keldysh effect or the Kerr effect is very small. In modulators using free carrier absorption, the output light is directly modulated through a change in the absorption rate of light propagating in Si. As a structure using such changes in the refractive index, one employing a Mach-Zehnder interferometer is generally used, where intensity modulated optical signals can be obtained by causing optical phase differences in the two arms that include a phase modulating portion to interfere with each other.

Free carrier density in the electro-optical modulators can be varied by injection, accumulation, depletion or inversion of free carriers. Most of such devices that have been studied to date have low optical modulation efficiency, and accordingly, for optical phase modulation, require a length on the order of millimeters and an injection current density higher than 1 kA/cm$^3$. In order to realize size reduction, higher integration and also a reduction in power consumption, a device structure giving high optical modulation efficiency is required, and if it is achieved, a reduction in the optical phase modulation length becomes possible. If the device size is large, the device becomes susceptible to the influence of temperature distribution over the silicon platform, and it is therefore assumed that a change in the refractive index of the silicon layer caused by a thermo-optic effect due to the temperature distribution cancels out the essentially existing electro-optic effect, thus raising a problem.

FIG. 1 shows a typical example of a silicon-based electro-optic phase modulator that uses a rib waveguide structure formed on an SOI substrate, which is shown in Non-patent Literature 1 (William M. J. Green, Michael J. Rooks, Lidija Sekaric, and Yurii A. Vlasof, Opt. Express 15, 17106-171113 (2007), "Ultra-compact, low RF power, 10 Gb/s silicon Mach-Zehnder modulator"). The electro-optic phase modulator is formed by slab regions that extend in the lateral direction on both sides of a rib-shaped structure including an intrinsic semiconductor region, with the slab regions being formed by a p-type or an n-type doping process, respectively. The aforementioned rib waveguide structure is formed utilizing the Si layer on a silicon-on-insulator (SOI) substrate. The structure shown in FIG. 1 corresponds to a PIN diode type modulator, and is a structure where the free carrier density in an intrinsic semiconductor region is changed by applying forward and reverse biases, and the refractive index is accordingly changed using a carrier plasma effect. In this example, intrinsic semiconductor silicon layer 1 is formed so as to include p-type region 4 subjected to highly concentrated doping in the region in contact with first electrode contact layer 6. In FIG. 1, intrinsic semiconductor silicon layer 1 includes region 5 subjected to still more highly concentrated n-type doping and second electrode contact layer 7 connected thereto. In the above-described PIN diode structure, regions 4 and 5 can also be subjected to doping so as to have a carrier density of approximately $10^{20}$ per cm$^3$. In the above-described PIN structure, p-type region 4 and n-type region 5 are arranged on both sides of rib 1 spaced apart from each other, and rib 1 is an intrinsic semiconductor layer.

In terms of the optical modulation operation, the optical modulator is connected to a power supply using the first and second electrode contact layers so as to apply a forward bias to the PIN diode and thereby inject free carriers into the waveguide. When the forward bias is applied, the refractive index of silicon layer 1 is changed as a result of the increase in free carriers, and phase modulation of light transmitted through the waveguide is thereby performed. However, the speed of the optical modulation operation is limited by the lifetime of free carriers in rib 1 and carrier diffusion in rib 1 when the forward bias is removed. Such related art PIN diode phase modulators generally can support only an operation speed in the range of 10 to 50 Mb/second during the forward bias operation.

In this respect, it is possible to increase the switching speed by introducing impurities into the silicon layer, and thereby shorten the carrier lifetime. However, there is the problem that the introduced impurities lower the optical modulation efficiency. The factor that has the greatest influence on the operation speed is a factor caused by the RC time constant, where the capacitance (C) at a time of forward bias application becomes very large as a result of a reduction in the carrier depletion layer width of the PN junction. While, theoretically, high speed operation of the PN junction could be achieved by applying a reverse bias, it requires a relatively high drive voltage or a large device size.

FIG. 2 illustrates a silicon-based electro-optic modulator having an SIS (silicon-insulator-silicon) structure according to WO2004/088394. WO2004/088394 proposes a silicon-based electro-optic modulator including a p-Si 4 second conductive type body region and an n-Si 5 first conductive type gate region stacked on the second conductive type body region so as to partially overlap the second conductive type body region in which relatively thin dielectric layer 11 is formed on this stack interface. Such a silicon-based electro-optic modulator is formed on an SOI platform, the body region is formed on a relatively thin silicon surface layer of the SOI substrate and the gate region is made up of a relatively thin silicon layer stacked on the SOI structure. The interiors of the gate and the body regions are doped and the doped regions are defined so that variations in carrier density are controlled by an external signal voltage. In this case, ideally, it is desirable to make an optical signal electric field coincide with the region where the carrier density is externally and dynamically controlled, in which situation optical phase modulation can be performed by accumulating, depleting or inverting free carriers on each side of dielectric layer 11. However, in practice there is a problem in that the region where the carrier density dynamically changes is an extremely thin region with a size of about several tens of nanometers, which results in the problem that an optical modulation length on the order of millimeters is required, and the electro-optic modulator accordingly becomes large in size, and consequently high speed operation is difficult.

On the other hand, an electro-absorption optical modulator using GeSi which is the same group IV semiconductor material is proposed as a silicon-based electro-optic modulator which can be downsized and operated at high speed. Non-patent Literature 2 (Dazeng Feng, Wei Qian, Hong Liang, Cheng-Chih Kung, Zhou Zhou, Zhi Li, Jacob S. Levy, Roshanak Shafiiha, Joan Fong, B. Jonathan Luff, and Mehdi Asghari, IEEE JOURNAL OF SELECTED TOPICS IN QUANTUM ELECTRONICS, VOL. 19, NO. 6, 3401710, NOVEMBER/DECEMBER 2013) reports a butt-joint coupled GeSi electro-absorption optical modulator directly optically coupled with a silicon waveguide.

FIG. 3 shows a schematic cross-sectional view of the butt-joint coupled GeSi electro-absorption optical modulator described in Non-patent Literature 2. The modulator includes i-GeSi 21 formed between p$^+$-GeSi 22 and n$^+$-GeSi 23, which are electrode layers, on Si slab 24 of an SOI substrate.

It is a problem with the electro-absorption optical modulator using GeSi disclosed in Non-patent Literature 2 how to efficiently optically couple with a Si waveguide, improve modulation efficiency, reduce light absorption by the electrode layer and achieve low optical loss. It is another problem with the electro-absorption optical modulator that the operation wavelength band is narrow and the operation wavelength band varies along with a temperature variation.

Although this GeSi electro-absorption optical modulator is enabled to operate at high speed, the electrode layer is formed by stacking a GeSi layer on the Si waveguide and subjecting the GeSi layer to p-type or n-type doping, which results in a problem that the optical coupling length increases and light absorption loss by the p- or n-doped GeSi electrode layer is large.

SUMMARY

It is an object of the present invention to provide an electro-absorption optical modulator capable of realizing highly efficient optical coupling with a Si waveguide, improving modulation efficiency, reducing light absorption by an electrode layer and achieving low optical loss.

One aspect of the present invention relates to an electro-absorption optical modulator that includes a substrate; a first silicon layer doped to exhibit a first type of conductivity and a second silicon layer doped to exhibit a second type of conductivity that are disposed parallel to the substrate; and $Ge_{1-x}Si_x$ (0<x<1)/Si stack in which a $Ge_{1-x}Si_x$ layer and a Si layer are stacked on the first and second silicon layers in this order.

Another aspect of the present invention relates to an electro-optic modulation apparatus that include at least two units of the above electro-absorption optical modulator optically connected via a Si-based optical waveguide, an input port and an output port; and at least one pair of the electro-absorption optical modulators is driven by a differential drive circuit.

A further aspect of the present invention relates to an optical integrated circuit that includes the above electro-absorption optical modulator or the above electro-optic modulation apparatus and a plurality of light modulation regions including $Ge_{1-x}Si_x$ (0<x<1)/Si stack on one substrate, wherein the functions as an optical modulator and a light receiver are adjusted by the pattern width of the $Ge_{1-x}Si_x$/Si stack.

According to one aspect of the present invention, it is possible to provide an electro-absorption optical modulator using GeSi capable of realizing highly efficient optical coupling with a Si waveguide, improving modulation efficiency, reducing light absorption by an electrode layer and achieving low optical loss.

EXAMPLE EMBODIMENT

Hereinafter, the present invention will be described with example embodiments.

Figure 4:
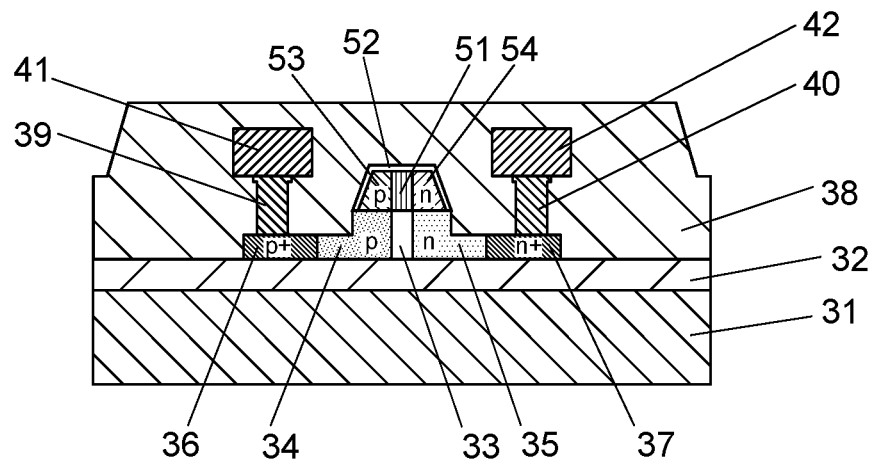
FIG. 4 is a schematic cross-sectional view of a structure example of an electro-absorption optical modulator including $Ge_{1-x}Si_x$/Si stack according to one example embodiment of the present invention.

FIG. 4 is a schematic cross-sectional view of a structure example of an electro-absorption optical modulator including $Ge_{1-x}Si_x$/Si stack according to one example embodiment of the present invention. In the electro-absorption optical modulator, as shown in FIG. 4, by forming first silicon (Si) layer 34 doped so as to exhibit a first type of conductivity (for example, p-type conductivity) and second silicon (Si) layer 35 doped so as to exhibit a second type of conductivity (for example, n-type conductivity), both being disposed parallel to support substrate 31 of an SOI substrate via buried oxide (BOX) layer 32 which constitutes a lower clad, stacking $Ge_{1-x}Si_x$ layer 51 and Si layer 52 on the first and second Si layers in this order to form $Ge_{1-x}Si_x$/Si stack. Further, the $Ge_{1-x}Si_x$/Si stack is subjected to p-type and n-type doping to form electrode layers 53 and 54, it is possible to reduce light absorption by the electrode layers. Note that support substrate 31 and BOX layer 32 may be simply collectively called a "substrate." In addition, Si layer 52 is also doped into p-type and n-type to form a part of electrodes, but it is omitted in the figure.

In this case, third Si layer 33 made up of an intrinsic semiconductor can be inserted between first Si layer 34 and second Si layer 35. That is, the insertion of third Si layer 33 made up of the intrinsic semiconductor improves light absorption by the first and second Si layers subjected to p-type and n-type doping as well as reducing parasitic capacitance.

Figure 5:
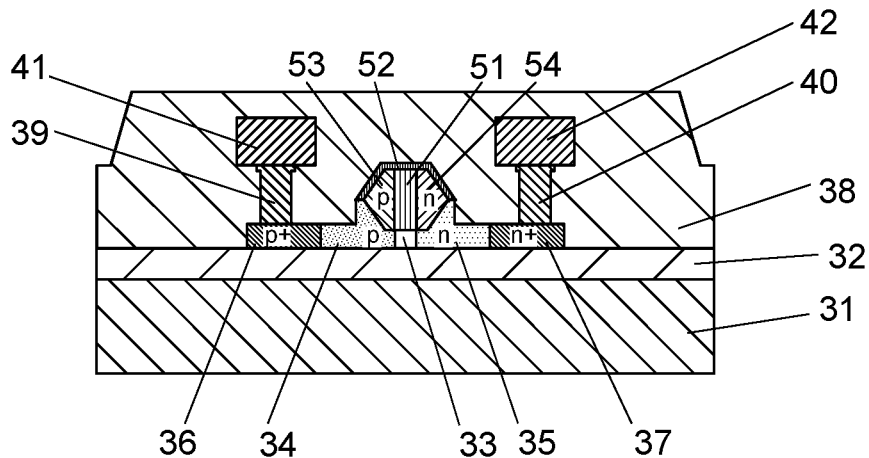
FIG. 5 is a schematic cross-sectional view of a structure example of an electro-absorption optical modulator including $Ge_{1-x}Si_x$/Si stack according to one example embodiment of the present invention.

According to another example embodiment, as shown in FIG. 5, at least part of the $Ge_{1-x}Si_x$/Si stack is embedded in the Si layers (33 to 35) directly connected to the Si waveguide to have a butt coupling structure, the optical coupling length is made smaller than the conventional length, the Si layers (34, 35) adjacent to the $Ge_{1-x}Si_x$/Si stack are subjected to p-type and n-type doping to be used as electrode layers and light absorption by the electrode layers is thereby reduced. Furthermore, large tensile distortion is applied to the $Ge_{1-x}Si_x$/Si stack embedded in the Si layer due to a difference in thermal expansion coefficient between the Si layer and $Ge_{1-x}Si_x$/Si layer 51 to be embedded, and so a Franz-Keldysh effect is enhanced.

In this case, by making first Si layer 34 and second Si layer 35 disposed parallel to support substrate 31 have a rib type waveguide structure, it is possible to attract an optical mode field toward the Si layer side and reduce optical loss in the $Ge_{1-x}Si_x$/Si stack in which the electrode is formed through p-type and n-type doping.

As for the $Ge_{1-x}Si_x$ layer, x is greater than 0 and less than 1 ($0 < x < 1$), and x is preferably 0.2 or less to become a Ge composition of 80% or more. This is because as the Si composition increases, the electro-optic effect decreases and the drive voltage also increases. Since a relatively large electro-optic effect is obtained with pure Ge, by applying distortion and reducing the band gap, light intensity modulation at 1600 nm which is a communication wavelength band is also possible. In addition, the long-distance optical communication requires to operate at C band of 1550 nm, and such an operation in the wavelength band of 1550 nm becomes possible by forming a GeSi mixed crystal layer with a large band gap in an interface of the $Ge_{1-x}Si_x$/Si stack.

When driving is done using a CMOS driver, low voltage operation is realized by connecting two or more electro-absorption optical modulators via the optical waveguide and differentially driving them, and waveform symmetry can also be improved by independently controlling DC bias voltages to be applied to the two or more electro-absorption optical modulators. By controlling pattern widths of the two or more $Ge_{1-x}Si_x$/Si stacks so as to have different widths, the operation wavelength band can be broaden.

Figure 6:
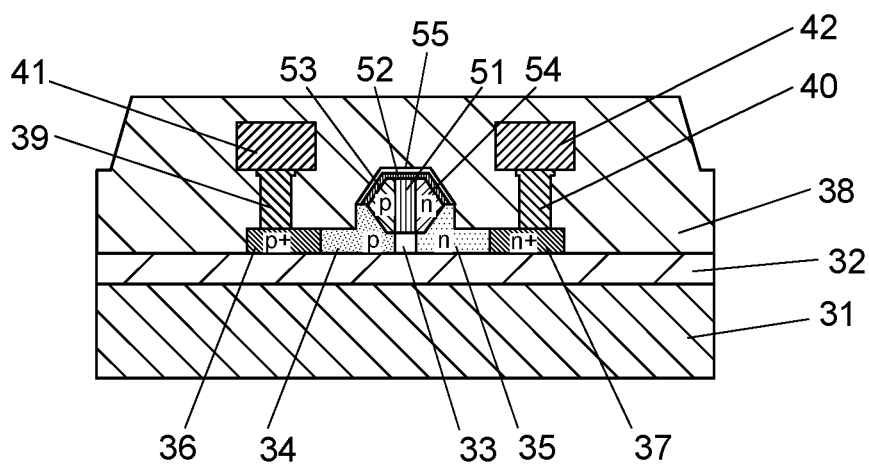
FIG. 6 is a schematic cross-sectional view of an electro-absorption optical modulator in which a layer giving lattice distortion is stacked on the $Ge_{1-x}Si_x$/Si stack according to one example embodiment of the present invention.

Furthermore, as shown in FIG. 6, by stacking a layer (distortion applying layer 55) that gives lattice distortion to $Ge_{1-x}Si_x$/Si stack on the $Ge_{1-x}Si_x$/Si stack, the electro-absorption optical modulator is enabled to generate light intensity modulation at a lower voltage. In this case, band gap energy is reduced by applying biaxial distortion to the <110> crystal orientation of the $Ge_{1-x}Si_x$/Si stack, and light intensity modulation can be achieved with high efficiency.

By forming a $Ge_{1-x}Si_x$ layer subjected to p-type or n-type doping in the $Ge_{1-x}Si_x$/Si stack deposited on the first and second Si layers subjected to p-type or n-type doping, the width of $Ge_{1-x}Si_x$ layer disposed between the p-type electrode layer and the n-type electrode layer is reduced and light intensity modulation can be generated at a lower voltage.

Other constituents shown in FIGS. 4 to 6 include a first contact 36 doped with the first conductive type (p+) impurity at high concentration in the first Si layer 34, a second contact 37 doped with the second conductive type (n+) impurity at high concentration in the second Si layer 35, oxide clad 38, a first electrode 39 connected to the first contact 36, a second electrode 40 connected to the second contact 37, a first wiring 41 and a second wiring 42.

Figure 7:
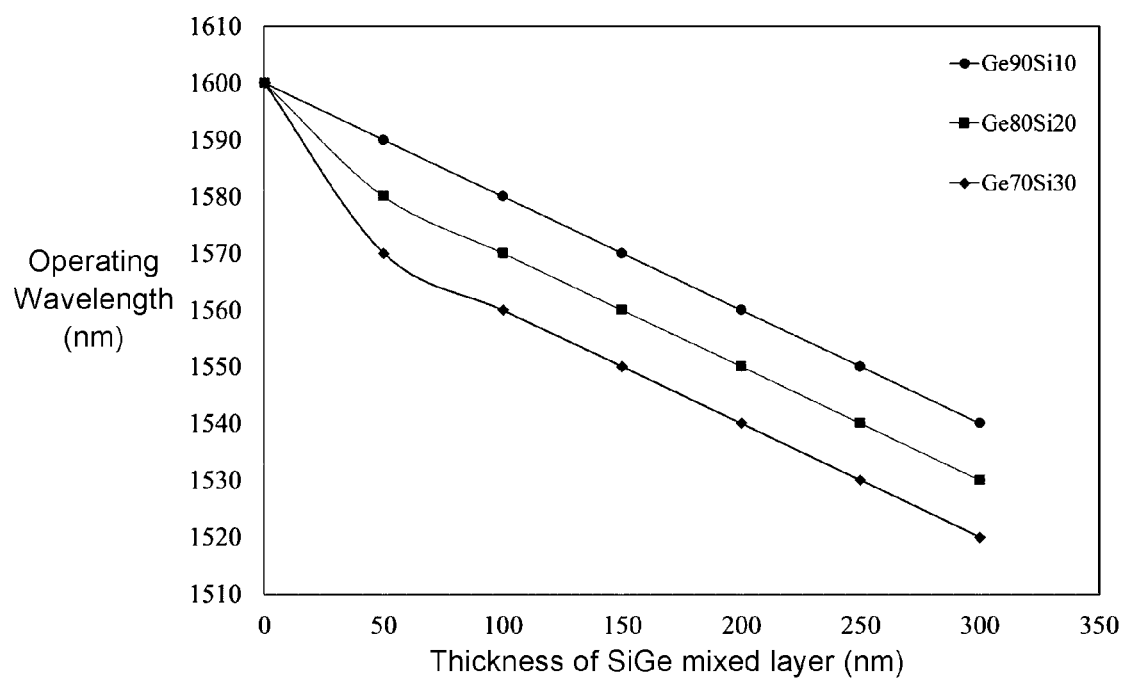
FIG. 7 is a graph showing dependence of light intensity modulation operating wavelength when changing the thickness and composition of GeSi mixed crystal layer in an electro-absorption optical modulator including $Ge_{1-x}Si_x$/Si stack according to one example embodiment of the present invention.

FIG. 7 is a graph showing dependence of light intensity modulation operating wavelength when changing the thickness and composition of GeSi mixed crystal layer formed in the interface of the $Ge_{1-x}Si_x$/Si stack in an electro-absorption optical modulator including $Ge_{1-x}Si_x$/Si stack according to one example embodiment of the present invention. The thickness and composition of GeSi mixed crystal layer can be controlled by adjusting deposition temperature of $Ge_{1-x}Si_x$/Si stack or subjecting to a heat treatment at about 700 to 800° C. after forming $Ge_{1-x}Si_x$/Si stack. At this time, by increasing the Si composition in the GeSi mixed crystal layer, it was possible to control the operating wavelength to a shorter wavelength. Moreover, by increasing the thickness of the GeSi mixed crystal layer, it was possible to increase the overlap between an optical mode field and the GeSi mixed crystal layer so as to make the operating wavelength to a shorter wavelength.

Figure 1:
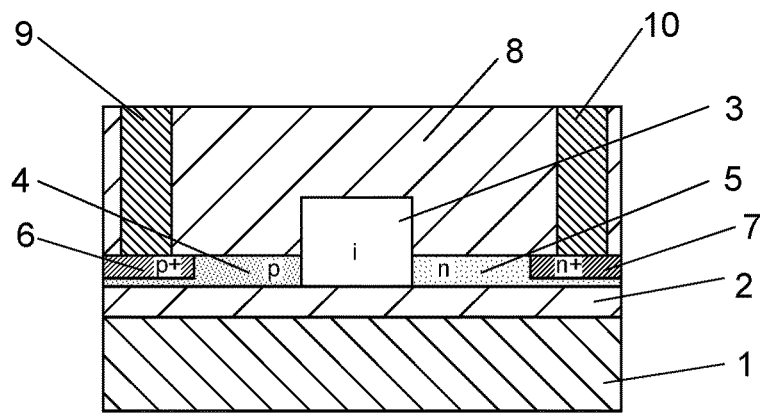
FIG. 1 is a cross-sectional view of an electro-optic modulator including a PIN structure according to the background art.
Figure 2:
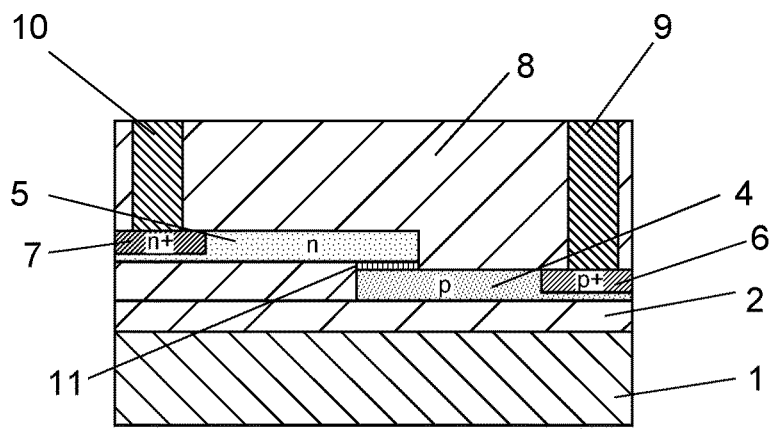
FIG. 2 is a cross-sectional view of an electro-optic modulator including an SIS structure according to the background art.
Figure 3:
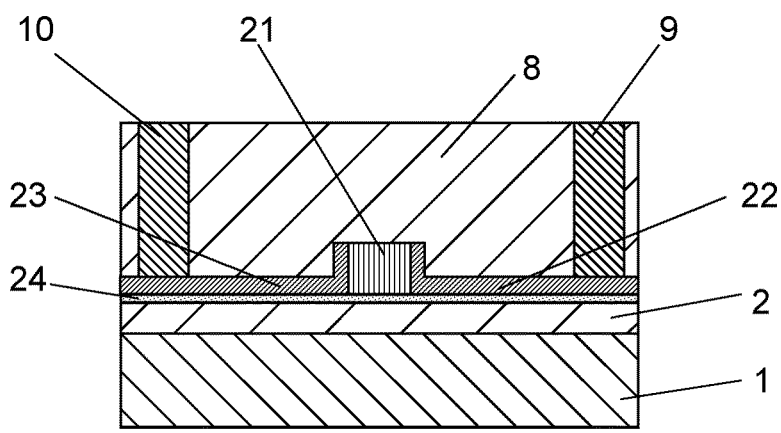
FIG. 3 is a schematic cross-sectional view of a GeSi electro-absorption optical modulator including GeSi according to the background art.
Figure 8A:
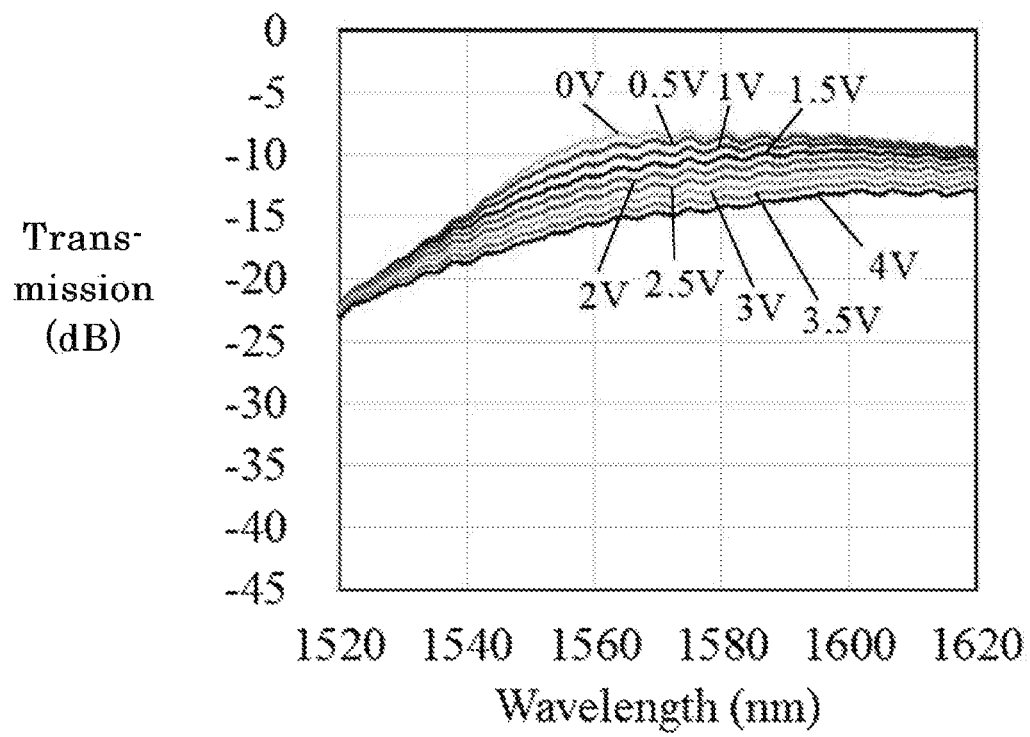
FIGS. 8A and 8B are graphs showing wavelength dependence of light transmittance when the width of the $Ge_{1-x}Si_x$/Si stack makes to 1.0 μm width FIG. 8A and 1.4 μm width FIG. 8B in an electro-absorption optical modulator including $Ge_{1-x}Si_x$/Si stack according to one example embodiment of the present invention.
Figure 8B:
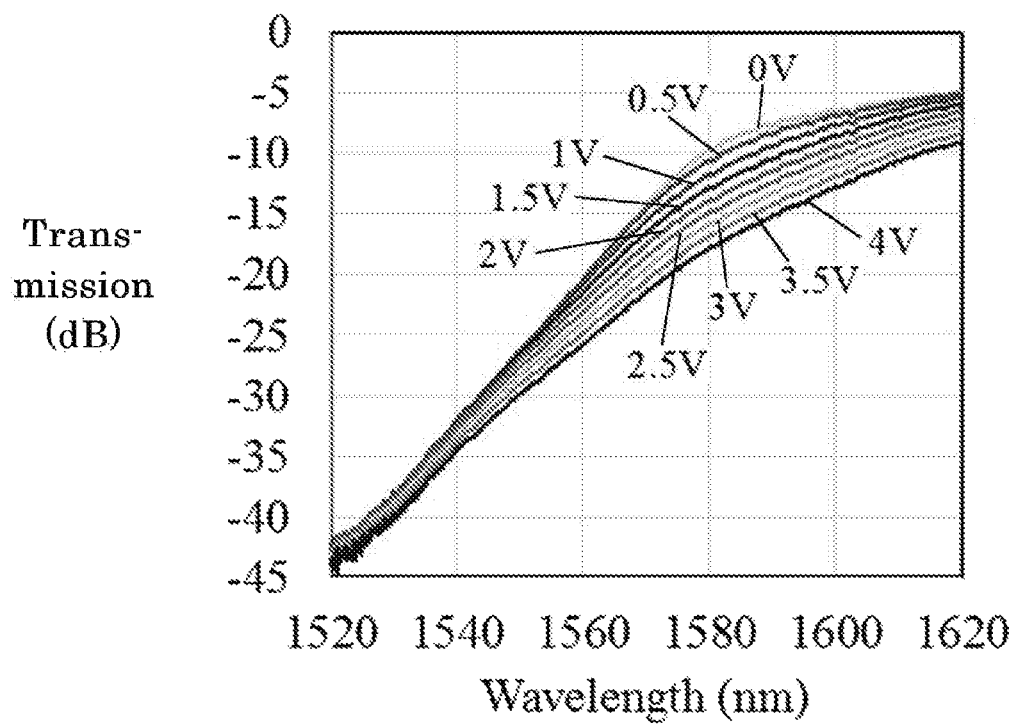

FIGS. 8A and 8B are graphs showing wavelength dependence of light transmittance when the width of the $Ge_{1-x}Si_x$/Si stack makes to 1.0 μm width FIG. 8A and 1.4 μm width FIG. 8B in an electro-absorption optical modulator including $Ge_{1-x}Si_x$/Si stack according to one example embodiment of the present invention. By decreasing the width of the stack, the light transmittance was changed by applying a voltage in a shorter wavelength and in a wide wavelength band. That is, it was possible to operating an optical intensity modulation in the wider wavelength band by decreasing the width of the $Ge_{1-x}Si_x$/Si stack.

Since the GeSi mixed crystal layer is more likely to occur at the side wall portion of the $Ge_{1-x}Si_x$/Si stack, by reducing the width of the stack, the overlap between the optical mode field and the mixed crystal layer becomes large and the operating wavelength can be shortened. In other words, it is possible to broaden the operating wavelength in the electro-absorption optical modulator and to control the operating wavelength by controlling the width of the $Ge_{1-x}Si_x$/Si stack.

Hereinafter, a method of manufacturing an electro-absorption optical modulator according to an embodiment of the present invention will be described.

FIGS. 9A to 9L are cross-sectional views illustrating manufacturing processes of the electro-absorption optical modulator using $Ge_{1-x}Si_x$/Si stack according to one example embodiment of the present invention.

Figure 9A:
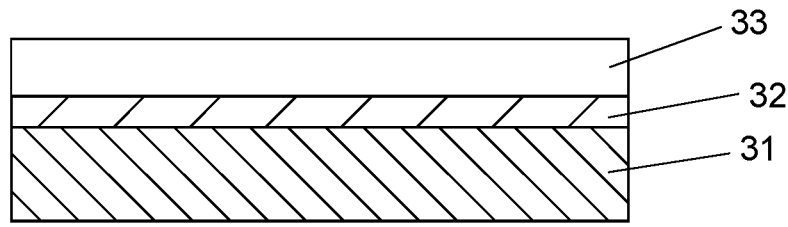
FIGS. 9A to 9L are cross-sectional views illustrating manufacturing processes of the electro-absorption optical modulator using $Ge_{1-x}Si_x$/Si stack according to one example embodiment of the present invention.

FIG. 9A shows a cross-sectional view of a SOI substrate for manufacturing the electro-absorption optical modulator according to one example embodiment of the present invention. The SOI substrate has a stacked structure including a supporting substrate 31, a BOX layer 32 and a Si layer 33 having a thickness on the order of 100 to 1000 nm stacked on the BOX layer 32. The BOX layer having a thickness of 1000 nm or more is applied in order to reduce optical loss. Note that since Si layer 33 on BOX layer 32 is set so that the <110> crystal orientation is substantially parallel to a direction of an applied electric field by the electrode, a greater electric field absorption effect can be obtained at a low voltage.

Figure 9B:
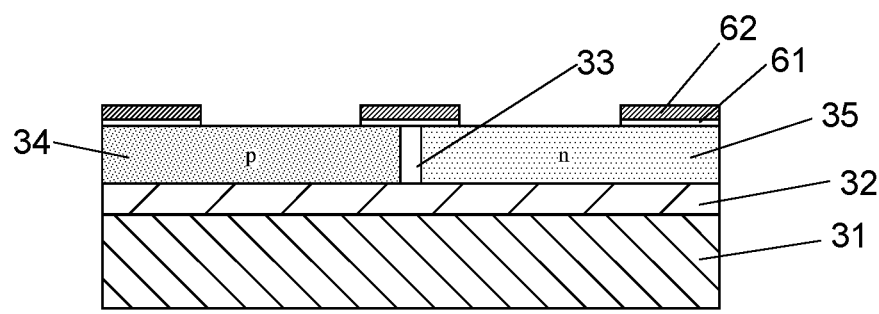

Next, as shown in FIG. 9B, the surface layer of Si layer 33 on BOX layer 32 is subjected to a doping process with P (phosphorus) or B (boron) by ion implantation exhibiting first and second conductive types, then given heat treatment, and an electrode layer made up of first Si layer 34 and second Si layer 35 is thereby formed. In this example embodiment, the non-doped Si layer 33 is left as a third Si layer between first Si layer 34 and second Si layer 35. Further, a stacked structure of an oxide film and a $SiN_x$ film is formed as a mask to form a rib waveguide and the stacked structure is patterned using UV lithography and a dry etching method or the like to form oxide film mask 61 and $SiN_x$ hard mask 62.

Figure 9C:
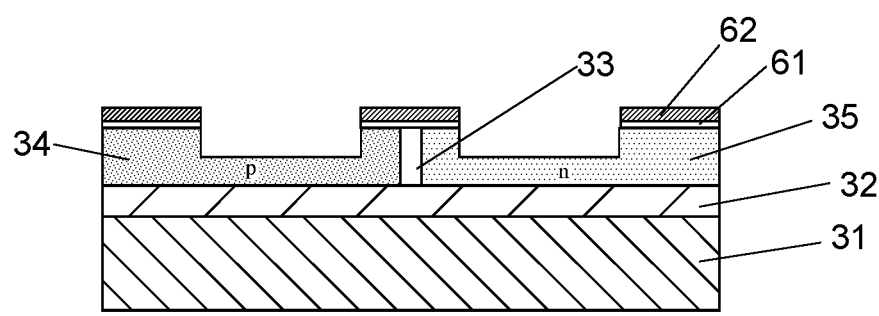

As shown in FIG. 9C, first and second Si layers 34 and 35 are patterned using oxide film mask 61 and $SiN_x$ hard mask 62 as a mask to obtain the rib waveguide.

Figure 9D:
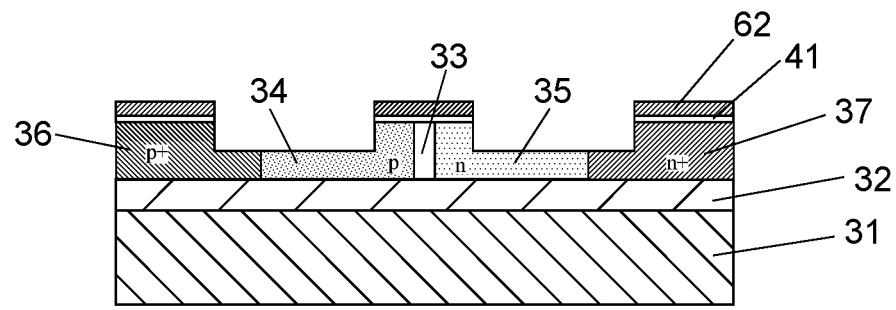

As shown in FIG. 9D, some regions of first and second Si layers 34 and 35 that have the same height as the rib waveguide are doped with highly concentrated B ions and P ions using an ion implantation method to sequentially form first and second contact layers 36 and 37.

Figure 9E:
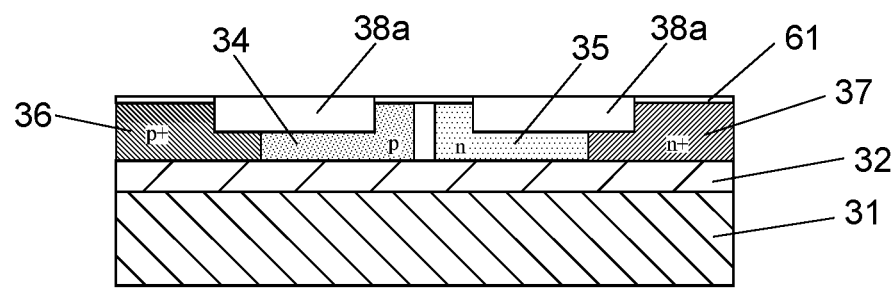

Next, as shown in FIG. 9E, oxide clad 38a for selective epitaxial growth (called "selective epitaxy") of the $Ge_{1-x}Si_x$/Si stack is stacked. In this case, applying a flattening process using a CMP (chemical mechanical polishing) method facilitates an opening process in the oxide clad for selective epitaxy of the $Ge_{1-x}Si_x$/Si stack. Note that the remaining $SiN_x$ hard mask 62 is removed by hot phosphoric acid treatment or the like.

Figure 9F:
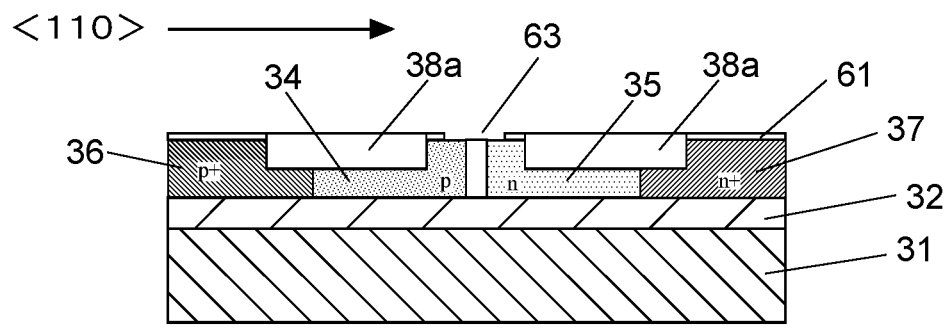

Next, as shown in FIG. 9F, opening 63 for selective epitaxy of the $Ge_{1-x}Si_x$/Si stack is formed in the oxide mask 61 on the lib waveguide by dry etching, fluoric acid treatment or the like.

Figure 9G:
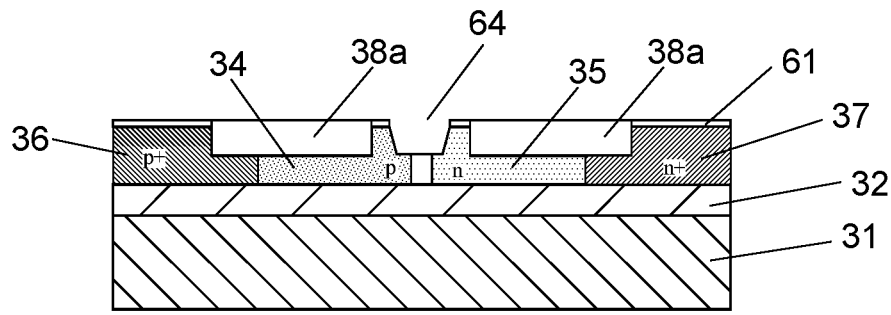

Next, as shown in FIG. 9G, a Si layer faced in the opening 63 is etched by dry etching to form recess 64 for selective epitaxy of the $Ge_{1-x}Si_x$/Si stack.

Figure 9H:
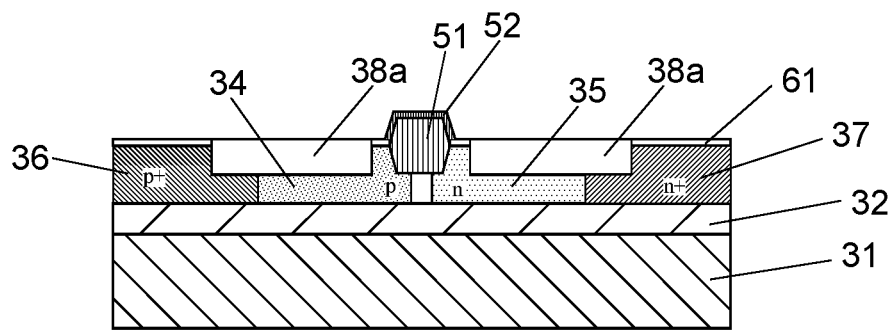

Afterward, as shown in FIG. 9H, a stacked film is selectively epitaxially grown in the recess 64 in the order of the $Ge_{1-x}Si_x$ layer 51 and the Si layer 52. At the time of stacking the Si layer 52 on the $Ge_{1-x}Si_x$ layer 51, the Si layer is deposited at the temperature range of about 600 to 700° C. to control the thickness and composition of the GeSi mixed layer.

Figure 9I:
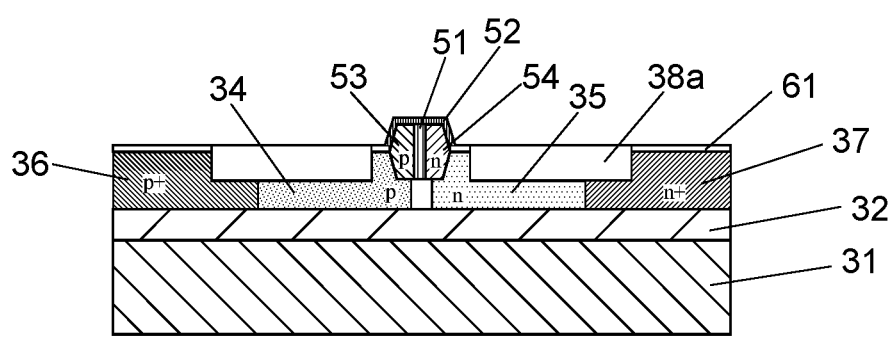

Next, as shown in FIG. 9I, the $Ge_{1-x}Si_x$/Si stack thus epitaxially grown is doped with B ions and P ions to form a p-type electrode layer 53 and an n-type electrode layer 54 so that a PIN junction structure is formed.

Figure 9J:
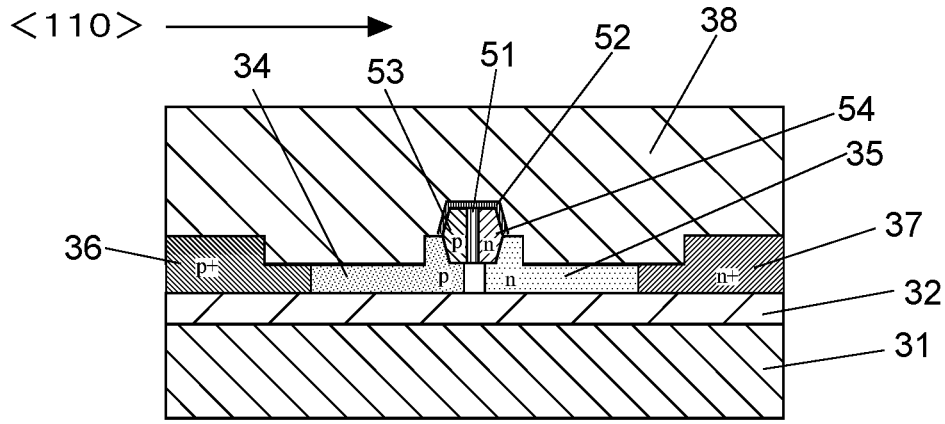

Next, as shown in FIG. 9J, an oxide having a thickness on the order of 1 μm is further stacked as oxide clad 38 and contact holes 65 to make electric contacts with first and second contact layers 36 and 37 are formed using a dry etching method or the like.

Figure 9K:
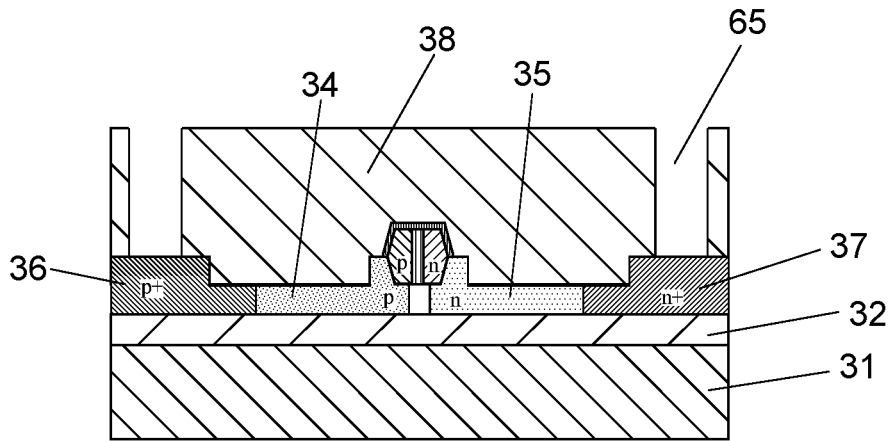
Figure 9L:
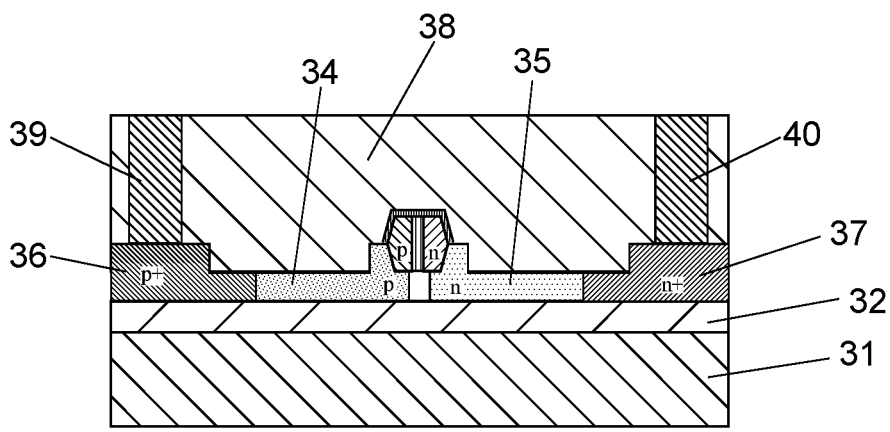

Finally, as shown in FIG. 9K, a metal layer such as Ti/TiN/Al (Cu) or Ti/TiN/W is formed using a sputtering method or a CVD method, patterned by reactive etching to form first electrode 39 connected to first contact 36, second electrode 40 connected to second contact 37 and first wiring 41 and second wiring 42 as shown in FIGS. 4 to 6 so as to make connections with the drive circuit.

Figure 10:
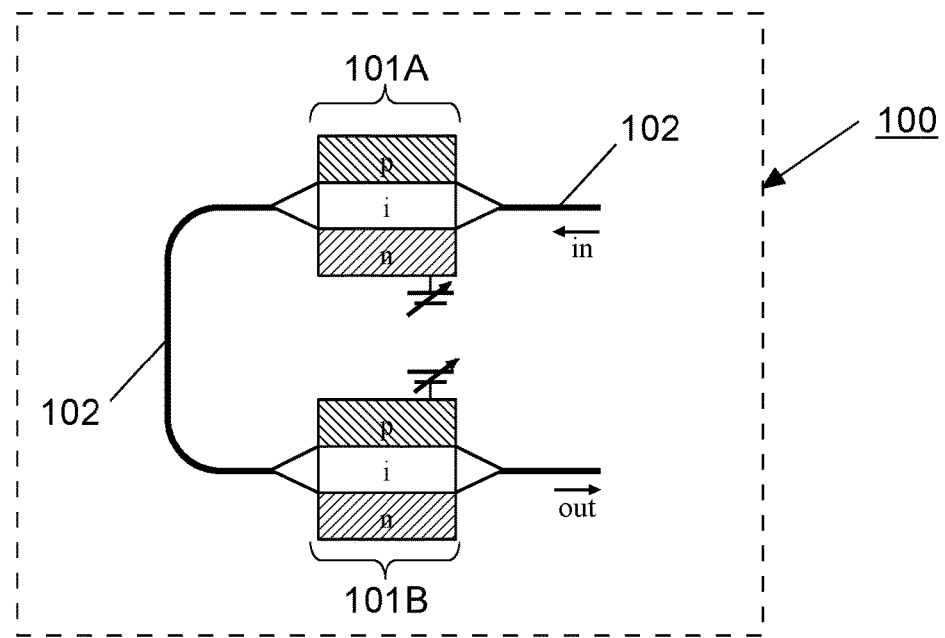
FIG. 10 is a diagram showing a configuration example of a light modulation device according to one example embodiment of the present invention.
Figure 11:
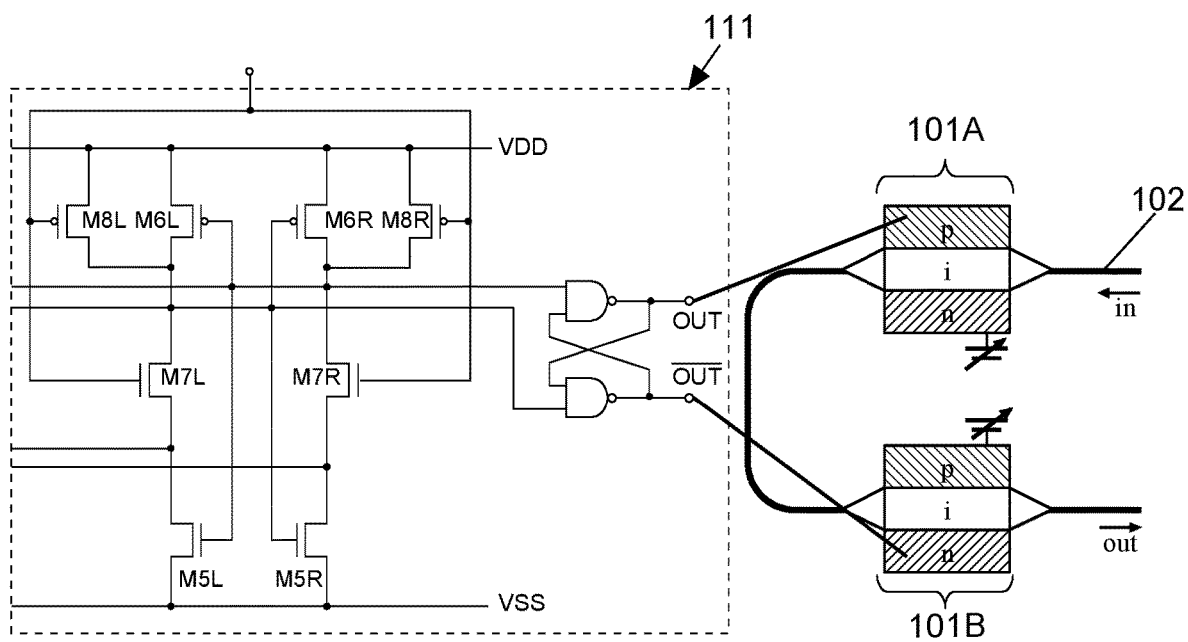
FIG. 11 is a configuration diagram illustrating an optical integrated circuit according to one example embodiment of the present invention.

In the electro-absorption optical modulator according to the example embodiment, at least two pairs of electro-absorption optical modulators 101A and 101B are connected in series via Si-based optical waveguide 102 as shown in FIG. 10 and input/output ports are set, to thereby constitute electro-optic modulation apparatus 100. Electro-optic modulation apparatus 100 can be driven by differential drive circuit 111 as shown in FIG. 11. Driving by differential drive circuit 111 makes it possible to generate light intensity modulation with higher efficiency. The number of electro-absorption optical modulators connected in series can be at least two, but is not limited. In this case, since electric signals with different polarities are applied from differential drive circuit 111, the electro-absorption optical modulators are arranged so that electric signals with different polarities and DC bias voltages are applied to the p-type electrode and the n-type electrode of the pair of electro-absorption optical modulators respectively.

Electro-optic modulation apparatus 100 including at least a pair of electro-absorption optical modulators is enabled to broaden the operating wavelength band by making the element widths of respective $Ge_{1-x}Si_x$/Si stacks different width each other. As a result, output fluctuation with respect to temperature change can also be improved.

In addition, the electro-absorption optical modulator or electro-optic modulation apparatus according to the example embodiment of the present invention can improve an optical absorption efficiency by DC bias voltage. In one example embodiment, it is possible to implement an optical integrated circuit that integrates a plurality of electro-absorption optical modulators on one substrate and by adjusting the functions as a modulator and a light receiver by pattern widths of respective $Ge_{1-x}Si_x$/Si stacks. For example, a portion in which the pattern width of the $Ge_{1-x}Si_x$/Si stack is less than 2 μm to form an optical modulator, and a portion in which the pattern width is 2 μm or more, are collectively formed on the same SOI platform. As a result, it is possible to realize an optical integrated circuit that integrates a GeSi electro-absorption optical modulator and a GeSi light receiver.

Although the present invention has been described above referring to example embodiments, the present invention is not limited to the above-described example embodiments. Various changes that can be understood by one skilled in the art can be made to the configuration and details of the present invention within the scope of the present invention.

SUPPLEMENTARY NOTE

The whole or part of the example embodiments disclosed above can be described as, but not limited to, the following supplementary notes:

Supplementary Note 1

An electro-absorption optical modulator including a substrate; a first silicon layer doped to exhibit a first type of conductivity and a second silicon layer doped to exhibit a second type of conductivity that are disposed parallel to the substrate; and $Ge_{1-x}Si_x(0<x<1)/Si$ stack in which a $Ge_{1-x}Si_x$ layer and a Si layer are stacked on the first and second silicon layers in this order.

Supplementary Note 2

The electro-absorption optical modulator according to Supplementary Note 1, wherein a GeSi mixed layer is formed at an interface of the $Ge_{1-x}Si_x/Si$ stack.

Supplementary Note 3

The electro-absorption optical modulator according to Supplementary Note 2, wherein an operating wavelength is controllable by the thickness and composition of the GeSi mixed layer.

Supplementary Note 4

The electro-absorption optical modulator according to Supplementary Note 3, wherein the thickness and composition of the GeSi mixed layer is controlled by a deposition condition of the $Ge_{1-x}Si_x/Si$ stack or a heat treatment after the deposition.

Supplementary Note 5

The electro-absorption optical modulator according to any one of Supplementary Notes 1 to 4, wherein a third Si layer composed of an intrinsic semiconductor is interposed between the first and second silicon layers.

Supplementary Note 6

The electro-absorption optical modulator according to any one of Supplementary Notes 1 to 5, wherein the $Ge_{1-x}Si_x/Si$ stack is embedded so that at least part of the $Ge_{1-x}Si_x/Si$ stack is sandwiched between the first and second silicon layers.

Supplementary Note 7

The electro-absorption optical modulator according to any one of Supplementary Notes 1 to 6, wherein a layer for giving lattice distortion to the $Ge_{1-x}Si_x/Si$ stack is stacked on the $Ge_{1-x}Si_x/Si$ stack.

Supplementary Note 8

The electro-absorption optical modulator according to Supplementary Note 7, wherein the layer for giving lattice distortion to the $Ge_{1-x}Si_x/Si$ stack is a layer that applies distortion in a 21 110> direction of the $Ge_{1-x}Si_x/Si$ stack.

Supplementary Note 9

The electro-absorption optical modulator according to any one of Supplementary Notes 1 to 8, wherein the $Ge_{1-x}Si_x/Si$ stack is electrically connected via electrode layers doped to exhibit to first and second types of conductivity to the first and second silicon layers that exhibit same conductivity types, respectively.

Supplementary Note 10

The electro-absorption optical modulator according to any one of Supplementary Notes 1 to 9, wherein the Ge concentration of the $Ge_{1-x}Si_x$ layer in $Ge_{1-x}Si_x/Si$ the stack is 80 atomic % or more.

Supplementary Note 11

An electro-optic modulation apparatus comprising:
at least two units of the electro-absorption optical modulator according to any one of the Supplementary notes 1-10 optically connected via a Si-based optical waveguide, an input port and an output port; and
at least one pair of electro-absorption optical modulators is driven by a differential drive circuit.

Supplementary Note 12

The electro-optic modulation apparatus according to Supplementary Note 11, wherein
the differential drive circuit performs waveform shaping on output waveforms by independently controlling DC bias voltages of the electro-absorption optical modulators to be paired.

Supplementary Note 13

The electro-optic modulation apparatus according to Supplementary Note 11 or 12, wherein
the widths of the $Ge_{1-x}Si_x/Si$ stacks of the respective elector-absorption optical modulators to be paired are set to different widths.

Supplementary Note 14

An optical integrated circuit comprising:
the electro-absorption optical modulator according to any one of Supplementary Notes 1-10,
wherein a plurality of optical modulation regions including the $Ge_{1-x}Si_x/Si$ stack are provided on one substrate, and
wherein the plurality of optical modulation regions are adjusted by a pattern width of the $Ge_{1-x}Si_x/Si$ stack to function as an optical modulator and a light receiver.

Supplementary Note 15

An optical integrated circuit comprising:
the electro-optic modulation apparatus according to any one of Supplementary Notes 11-13,
wherein a plurality of optical modulation regions including the $Ge_{1-x}Si_x/Si$ stack are provided on one substrate, and
wherein the plurality of optical modulation regions are adjusted by a pattern width of the $Ge_{1-x}Si_x/Si$ stack to function as an optical modulator and a light receiver.

What is claimed is:
1. An electro-absorption optical modulator comprising:
a substrate;
a first silicon layer doped to exhibit a first type of conductivity and a second silicon layer doped to exhibit a second type of conductivity that are disposed parallel to the substrate;

a $Ge_{1-x}Si_x$ (0<x<1)/Si stack in which a $Ge_{1-x}Si_x$ layer and a Si layer are stacked on the first and second silicon layers in this order; and a GeSi mixed crystal layer formed at an interface of the $Ge_{1-x}Si_x$/Si stack, wherein the $Ge_{1-x}Si_x$/Si stack is formed into a PIN junction structure, and a thickness and composition of the GeSi mixed crystal layer is configured by a deposition condition of the $Ge_{1-x}Si_x$/Si stack or a post-deposition heat treatment, so as to control an operating wavelength of the modulator.

2. The electro-absorption optical modulator according to claim 1, wherein a third Si layer composed of an intrinsic semiconductor is interposed between the first and second silicon layers.

3. The electro-absorption optical modulator according to claim 1, wherein the $Ge_{1-x}Si_x$/Si stack is embedded so that at least part of the $Ge_{1-x}Si_x$/Si stack is sandwiched between the first and second silicon layers.

4. The electro-absorption optical modulator according to claim 1, wherein a layer for giving lattice distortion to the $Ge_{1-x}Si_x$/Si stack is stacked on the $Ge_{1-x}Si_x$/Si stack.

5. The electro-absorption optical modulator according to claim 4, wherein the layer for giving lattice distortion to the $Ge_{1-x}Si_x$/Si stack is a layer that applies distortion in a <110> direction of the $Ge_{1-x}Si_x$/Si stack.

6. The electro-absorption optical modulator according to claim 1, wherein the $Ge_{1-x}Si_x$/Si stack is electrically connected via electrode layers doped to exhibit to first and second types of conductivity to the first and second silicon layers that exhibit same conductivity types, respectively.

7. The electro-absorption optical modulator according to claim 1, wherein the Ge concentration of the $Ge_{1-x}Si_x$ layer in the $Ge_{1-x}Si_x$/Si stack is 80 atomic % or more.

8. An electro-optic modulation apparatus comprising:

at least two units of the electro-absorption optical modulator according to claim 1 optically connected via a Si-based optical waveguide, an input port and an output port; and at least one pair of the electro-absorption optical modulators is driven by a differential drive circuit.

9. The electro-optic modulation apparatus according to claim 8, wherein the differential drive circuit performs waveform shaping on output waveforms by independently controlling DC bias voltages of the electro-absorption optical modulators to be paired.

10. The electro-optic modulation apparatus according to claim 8, wherein the widths of the $Ge_{1-x}Si_x$/Si stacks of the respective electro-absorption optical modulators to be paired are set to different widths.

11. An optical integrated circuit comprising:

the electro-absorption optical modulator according to claim 1, wherein a plurality of optical modulation regions including the $Ge_{1-x}Si_x$/Si stack is provided on one substrate, and wherein the plurality of optical modulation regions is adjusted by a pattern width of the $Ge_{1-x}Si_x$/Si stack to function as an optical modulator and a light receiver.

12. An optical integrated circuit comprising:

the electro-optic modulation apparatus according to claim 8, wherein a plurality of optical modulation regions including the $Ge_{1-x}Si_x$/Si stack is provided on one substrate, and wherein the plurality of optical modulation regions is adjusted by a pattern width of the $Ge_{1-x}Si_x$/Si stack to function as an optical modulator and a light receiver.

13. The electro-absorption optical modulator according to claim 1, wherein the GeSi mixed crystal layer has a gradient composition.

14. The electro-absorption optical modulator according to claim 1, wherein a concentration of Ge in the GeSi mixed crystal layer is a gradient towards the Si layer.

* * * * *